(12) United States Patent
Kabe (10) Patent No.: US 9,045,137 B2
(45) Date of Patent: Jun. 2, 2015

(54) START CONTROL METHOD, START CONTROL DEVICE, HYBRID VEHICLE, AND COMPUTER PROGRAM

(75) Inventor: Satoshi Kabe, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 87 days.

(21) Appl. No.: 13/876,180

(22) PCT Filed: Oct. 20, 2011

(86) PCT No.: PCT/JP2011/074161
§ 371 (c)(1),
(2), (4) Date: Mar. 27, 2013

(87) PCT Pub. No.: WO2012/053593
PCT Pub. Date: Apr. 26, 2012

(65) Prior Publication Data
US 2013/0184919 A1 Jul. 18, 2013

(30) Foreign Application Priority Data
Oct. 21, 2010 (JP) ................... 2010-236608

(51) Int. Cl.
*B60L 9/00* (2006.01)
*B60L 11/00* (2006.01)
(Continued)

(52) U.S. Cl.
CPC ............... *B60W 20/20* (2013.01); *B60K 6/547* (2013.01); *B60L 15/2045* (2013.01); *B60W 10/06* (2013.01); *B60W 10/08* (2013.01); *B60W 20/00* (2013.01); *B60W 30/18027* (2013.01); *B60W 30/192* (2013.01); *F02D 29/02* (2013.01); *F02N 11/0825* (2013.01); *F02N 11/0837* (2013.01);
(Continued)

(58) Field of Classification Search
CPC ...... B60K 6/547; B60W 10/00; B60W 10/06; B60W 10/08; B60W 30/18027; B60W 30/192; B60W 20/00; B60W 20/20; B60W 2510/244; B60W 2510/246; B60L 15/2045; F02D 29/02; F02N 11/0825; F02N 11/0837
USPC ........... 701/22, 110; 180/65.21, 65.23, 65.27, 180/65.245
See application file for complete search history.

(56) References Cited

U.S. PATENT DOCUMENTS

| | | | |
|---|---|---|---|
| 7,489,101 B2 * | 2/2009 | Bockelmann et al. | 320/104 |
| 7,520,353 B2 * | 4/2009 | Severinsky et al. | 180/65.28 |

(Continued)

FOREIGN PATENT DOCUMENTS

| | | |
|---|---|---|
| DE | 102006034933 A1 | 7/2006 |
| EP | 1386772 A1 | 2/2004 |

(Continued)

OTHER PUBLICATIONS

International Search Report of the corresponding International Application, PCT/JP2011/074161 dated Nov. 15, 2011.

*Primary Examiner* — Jason Holloway
*Assistant Examiner* — Rachid Bendidi
(74) *Attorney, Agent, or Firm* — Cowan, Liebowitz & Latman, P.C.; Mark Montague (57) ABSTRACT

To carry out a start with good fuel economy without resulting in a power shortage or a forcefulness shortage. A hybrid automobile is structured which executes a start control method including a selection step of selecting one start method from among a start only by a motor, a start only by an engine, and a start by the motor and the engine in cooperation with each other and a control step of controlling the execution of the start by the start method selected.

7 Claims, 7 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 20/00* (2006.01)
*B60K 6/547* (2007.10)
*B60L 15/20* (2006.01)
*B60W 10/06* (2006.01)
*B60W 10/08* (2006.01)
*B60W 30/18* (2012.01)
*B60W 30/192* (2012.01)
*F02D 29/02* (2006.01)
*F02N 11/08* (2006.01)
*F02M 21/02* (2006.01)

(52) U.S. Cl.
CPC ..... *F02N 2200/061* (2013.01); *F02N 2200/124* (2013.01); *Y02T 10/6286* (2013.01); *Y02T 10/48* (2013.01); *Y10S 903/903* (2013.01); *F02M 21/0212* (2013.01); *B60W 2510/244* (2013.01); *B60W 2510/246* (2013.01); *B60W 2550/142* (2013.01); *Y02T 10/7283* (2013.01)

(56) References Cited

U.S. PATENT DOCUMENTS

| | | | | |
|---|---|---|---|---|
| 7,597,164 | B2* | 10/2009 | Severinsky et al. | 180/65.27 |
| 7,631,710 | B2* | 12/2009 | Utsumi | 180/65.21 |
| 7,831,850 | B2* | 11/2010 | LeProwse et al. | 713/320 |
| 2004/0012206 | A1* | 1/2004 | Wakashiro et al. | 290/40 C |
| 2007/0272456 | A1 | 11/2007 | Shiiba | |
| 2008/0029320 | A1* | 2/2008 | Fleckner et al. | 180/65.2 |
| 2009/0143950 | A1* | 6/2009 | Hasegawa et al. | 701/68 |
| 2012/0022732 | A1* | 1/2012 | Taspinar et al. | 701/22 |
| 2012/0249061 | A1* | 10/2012 | Watanabe | 320/107 |
| 2013/0184919 | A1* | 7/2013 | Kabe | 701/22 |

FOREIGN PATENT DOCUMENTS

| | | |
|---|---|---|
| EP | 2065243 A2 | 6/2009 |
| JP | 2003-220838 A | 8/2003 |
| JP | 2005-320890 A | 11/2005 |
| JP | 2005-325804 A | 11/2005 |

* cited by examiner

Fig.7

START CONTROL METHOD, START CONTROL DEVICE, HYBRID VEHICLE, AND COMPUTER PROGRAM

CROSS REFERENCE TO RELATED APPLICATIONS

This is a U.S. national stage of application No. PCT/JP2011/074161, filed on Oct. 20, 2011. Priority under 35 U.S.C. §119(a) and 35 U.S.C. §365(b) is claimed from Japanese Patent Application No. 2010-236608, filed on Oct. 21, 2010, the disclosure of which are also incorporated herein by reference.

TECHNICAL FIELD

The present invention relates to a start control method, a start control device, a hybrid vehicle, and a computer program.

BACKGROUND ART

A hybrid vehicle includes an engine and an electric motor. The hybrid vehicle can run by using the engine or the electric motor, or by using the engine and the electric motor in cooperation with each other. The hybrid vehicle described above starts by using the electric motor, and, when the vehicle reaches a certain speed, it runs with the engine instead of the electric motor. Exhaust gas emitted from the engine upon the start can be reduced. Thus, the fuel economy can be enhanced (see, for example, patent literature PTL1).

CITATION LIST

Patent Literature

PTL1: JP 2006-132448 A

SUMMARY OF INVENTION

Technical Problem

As described above, the hybrid vehicle has an effect of reducing exhaust gas and fuel economy by using the electric motor upon the start. Conventionally, there are hybrid vehicles that can always start with the electric motor, so long as a battery can feed electric power to the electric motor.

The conventional hybrid vehicle starts by using the electric motor, if the battery can feed electric power to the electric motor, although the charged level is low. However, in this case, electric power becomes insufficient just after the start of the vehicle, and the electric motor cannot output required traction force. Therefore, a driver might feel a lack of power, or the vehicle might slow down. In addition, after the vehicle starts with the lack of electric power as described above, electric power for assisting the engine becomes also insufficient, so that a satisfactory effect of enhancing fuel economy cannot be attained.

The present invention is accomplished in view of the circumstance described above, and aims to provide a start control method, a start control device, a hybrid vehicle, and a computer program that can make the hybrid vehicle start with excellent fuel economy without a lack of electric power and lack of power.

Solution to Problem

One aspect of the present invention is directed to a start control method. The start control method in a start control device controlling a start of a hybrid vehicle that includes an engine, an electric motor, and a battery supplying electric power to the electric motor, and that can run by using the engine, by using the electric motor, or by using the engine and the electric motor in cooperation with each other, the start control method includes: a selecting step of selecting any one of starting modes, which are a starting mode using only the electric motor, a starting mode using only the engine, and a starting mode using the electric motor and the engine in cooperation with each other, according to a predetermined condition of the battery; and a control step of controlling the execution of the start in accordance with the selected starting mode.

For example, the predetermined condition is a condition involved with a charged state of the battery, a condition involved with a temperature of the battery, and a condition involved with both the charged state of the battery and the temperature of the battery.

The start control method may further includes a step of observing a change in the charged state or the temperature of the battery, wherein a reference point for the determination when the observation result is on the point of the process where the situation is changed from the situation in which the starting mode using only the electric motor is allowed to the situation in which the same starting mode is not allowed, and a reference point for the determination when the observation result is on the point of the process where the situation is changed from the situation in which the starting mode using only the electric motor is not allowed to the situation in which the same starting mode is allowed, are set to be different from each other.

Further, a state of a rising slope of a road surface where the hybrid vehicle starts may be added as the condition in addition to the predetermined condition, and the starting mode using only the electric motor may not be allowed, when a value indicating the rising slope exceeds a predetermined value even if the starting mode using only the electric motor is allowed according to the determination result in the process of the first step.

Another aspect of the present invention is directed to a start control device. The start control device includes a start control unit that executes the start control method according to the aspect of the present invention.

Still another aspect of the present invention is directed to a hybrid vehicle. The hybrid vehicle includes the start control device according to the aspect of the present invention.

The other aspect of the present invention is directed to a computer program. The computer program causes an information processing apparatus to implement a function of the start control device according to the aspect of the present invention.

Advantageous Effects of Invention

According to the present invention, the vehicle can start with excellent fuel economy without a lack of electric power and a lack of power.

DESCRIPTION OF EMBODIMENTS

First Embodiment

A hybrid vehicle according to a first embodiment of the present invention will be described below with reference to FIGS. 1 to 4.

Figure 1:
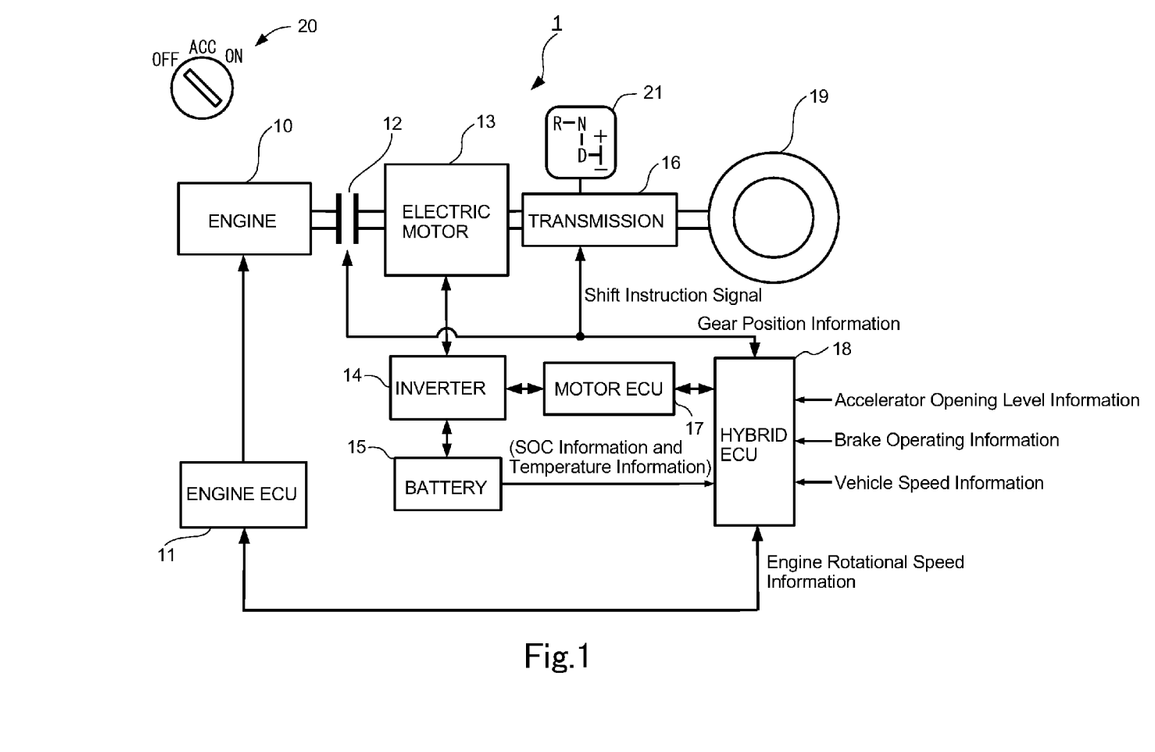
FIG. 1 is a block diagram illustrating an example of a configuration of a hybrid vehicle according to a first embodiment of the present invention.

FIG. 1 is a block diagram illustrating an example of a configuration of a hybrid vehicle 1. The hybrid vehicle 1 is one example of vehicles. The hybrid vehicle 1 is driven by an engine (internal combustion engine) 10 and/or an electric motor 13 through a transmission that is a semiautomatic transmission. At least staring, the hybrid vehicle 1 starts under one of starting modes including a starting mode using only the electric motor 13, a starting mode using only the engine 10, and a starting mode using the electric motor 13 and the engine 10 in cooperation with each other, selected according to at least a state of charge (hereinafter referred to as SOC) of the battery 15. The semiautomatic transmission has a configuration same as a manual transmission, but can realize an automatic shift operation.

The hybrid vehicle 1 includes an engine 10, an engine ECU (Electronic Control Unit) 11, a clutch 12, an electric motor 13, an inverter 14, a battery 15, a transmission 16, a motor ECU 17, a hybrid ECU 18, a wheel 19, a key switch 20, and a shift unit 21. The transmission 16 has the above-mentioned semiautomatic transmission, and is operated by the shift unit 21 having a drive range (hereinafter referred to as D (Drive) range).

The engine 10 is one example of the internal combustion engine. It is controlled by the engine ECU 11 to burn gasoline, light gas oil, CNG (Compressed Natural Gas), LPG (Liquefied Petroleum Gas), or alternate fuel therein, thereby generating power for rotating a shaft. It then transmits the generated power to the clutch 12.

The engine ECU 11 is a computer that works in conjunction with the motor ECU 17 in accordance with an instruction from the hybrid ECU 18. It controls the engine 10, i.e., controls the fuel injection amount or valve timing. For example, the engine ECU 11 is composed of a CPU (Central Processing Unit), ASIC (Application Specific Integrated Circuit), microprocessor (microcomputer), and DSP (Digital Signal Processor), and includes an operation unit, a memory, and an I/O (Input/Output) port.

The clutch 12 is controlled by the hybrid ECU 18, and transmits a shaft output from the engine 10 to the wheel 19 via the electric motor 13 and the transmission 16. Specifically, the clutch 12 mechanically connects the rotation shaft of the engine 10 and the rotation shaft of the electric motor 13 to transmit the shaft output of the engine 10 to the electric motor 13, or cuts the mechanical connection between the rotation shaft of the engine 10 and the rotation shaft of the electric motor 13 to allow the rotation shaft of the engine 10 and the rotation shaft of the electric motor 13 to rotate with a different rotational speed, under the control of the hybrid ECU 18.

For example, the clutch 12 mechanically connects the rotation shaft of the engine 10 and the rotation shaft of the electric motor 13, when the hybrid vehicle 1 runs by the power from the engine 10, by which the electric motor 13 generates electric power; when the engine 10 is assisted by the driving force of the electric motor 13; and when the engine 10 is started by the electric motor 13.

For example, the clutch 12 cuts the mechanical connection between the rotation shaft of the engine 10 and the rotation shaft of the electric motor 13, when the engine 10 is stopped or in an idling condition, and the hybrid vehicle 1 runs with the driving force of the electric motor 13, or when the engine 10 is stopped or in an idling condition, the hybrid vehicle 1 reduces its speed, or runs on a downhill, and the electric motor 13 generates electric power (regenerates electric power).

The clutch 12 is different from a clutch that is operated by the driver's operation on a clutch pedal, and it is operated by the control of the hybrid ECU 18.

The electric motor 13 is a so-called motor generator, and it generates power for rotating a shaft by electric power supplied from the inverter 14, and supplies the shaft output to the transmission 16. Alternatively, the electric motor 13 generates electric power by the power for rotating the shaft supplied from the transmission 16, and supplies the electric power to the inverter 14. When the hybrid vehicle 1 increases its speed, or runs with a constant speed, the electric motor 13 generates power for rotating the shaft, and supplies the shaft output to the transmission 16, thereby allowing the hybrid vehicle 1 to run in cooperation with the engine 10. For example, when the hybrid vehicle 1 runs without using power, such as in the case where the electric motor 13 is driven by the engine 10, or in the case where the hybrid vehicle 1 reduces its speed or runs on a downhill, the electric motor 13 operates as a motor generator. In this case, the electric motor 13 generates electric power by the power for rotating the shaft supplied from the transmission 16, and supplies the electric power to the inverter 14, whereby the battery 15 is charged.

The inverter 14 is controlled by the motor ECU 17, and it converts DC voltage from the battery 15 into AC voltage, or converts AC voltage from the electric motor 13 to DC voltage. When the electric motor 13 generates power, the inverter 14 converts the DC voltage from the battery 15 into AC voltage so as to supply the electric power to the electric motor 13. When the electric motor 13 generates electric power, the inverter 14 converts the AC voltage from the electric motor 13 into DC voltage. Specifically, in this case, the inverter 14 functions as a rectifier or a voltage regulation device for feeding DC voltage to the battery 15.

The battery 15 is a chargeable secondary battery. It feeds electric power to the electric motor 13 through the inverter 14 when the electric motor 13 generates power, or it is charged by the electric power generated from the electric motor 13 when the electric motor 13 generates electric power.

The transmission 16 has a semiautomatic transmission (not illustrated in the drawings) for selecting any one of plural gear ratios (transmission gear ratios) in accordance with a instruction signal to shift from the hybrid ECU 18. It changes the transmission gear ratio, and transmits the shifted power of the engine 10 and/or the shifted power of the electric motor 13 to the wheel 19. When the vehicle reduces its speed, or runs on the downhill, the transmission 16 transmits power from the wheel 19 to the electric motor 13. In the semiautomatic transmission, the driver can manually change the gear position to an arbitrary gear number by operating the shift unit 21.

The motor ECU 17 is a computer that works in conjunction with the engine ECU 11 in accordance with an instruction from the hybrid ECU 18. It controls the electric motor 13 by controlling the inverter 14. For example, the motor ECU 17 is composed of a CPU, ASIC, microprocessor (microcomputer), and DSP, and includes an operation unit, a memory, and an I/O port.

The hybrid ECU 18 is one example of a computer. It acquires accelerator opening information, brake operation information, vehicle speed information, gear position information acquired from the transmission 16, and engine rotational speed information acquired from the engine ECU 11, and controls the clutch 12 as well as supplies the instruction signal to shift to control the transmission 16 by referring to the acquired information. The hybrid ECU 18 issues an instruction to the motor ECU 17 to control the electric motor 13 and the inverter 14, and issues an instruction to the engine ECU 11 to control the engine 10, in order to realize a hybrid driving. In order to realize the hybrid driving, the hybrid ECU 18 acquires SOC information and temperature information from the battery 15, and controls the engine ECU 11, the clutch 12, and the motor ECU 17, thereby executing the start control. For example, the hybrid ECU 18 is composed of a CPU, ASIC, microprocessor (microcomputer), and DSP, and includes an operation unit, a memory, and an I/O port.

A computer program to be executed by the hybrid ECU 18 can preliminarily be installed to the hybrid ECU 18 that is a computer by storing the computer program beforehand into a non-volatile memory in the hybrid ECU 18.

The engine ECU 11, the motor ECU 17, and the hybrid ECU 18 are interconnected with a bus in accordance with a standard such as CAN (Control Area Network).

The wheel 19 is a driving wheel that transmits driving force to a road surface. Although FIG. 1 illustrates only one wheel 19, the hybrid vehicle 1 actually includes plural wheels 19.

The key switch 20 is turned ON or OFF by a driver who inserts a key into the key switch 20 upon starting the vehicle 1. When the key switch 20 is turned ON, the respective units of the hybrid vehicle 1 are started, and when the key switch 20 is turned OFF, the respective units of the hybrid vehicle 1 are stopped.

Figure 2:
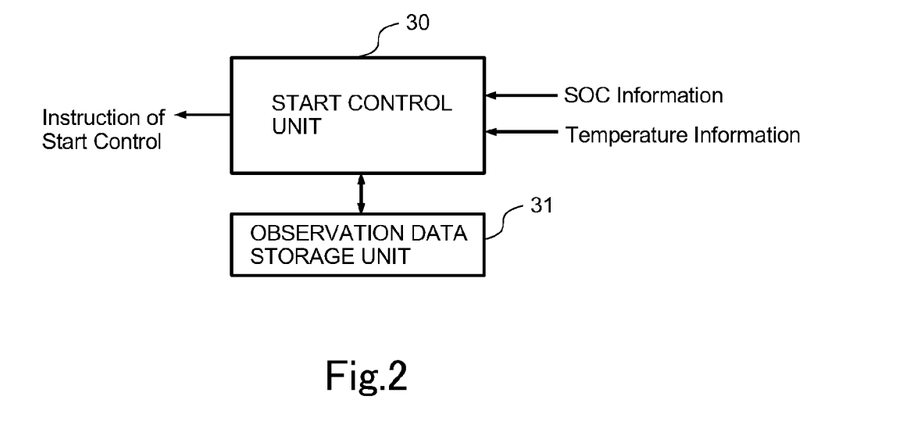
FIG. 2 is a block diagram illustrating an example of a configuration of functions realized by a hybrid ECU in FIG. 1.

FIG. 2 is a block diagram illustrating an example of a configuration of functions realized by the hybrid ECU 18 that executes a computer program. When the hybrid ECU 18 executes the computer program, a start control unit 30 and an observation data storage unit 31 are realized.

The start control unit 30 issues a start control instruction to the engine ECU 11, the clutch 12, and the motor ECU 14 based upon the SOC information and temperature information of the battery 15.

A part of a memory area of the hybrid ECU 18 is allocated to the observation data storage unit 31, and it stores the SOC information and the temperature information of the battery 15 for a certain period.

A process of the start control executed by the hybrid ECU 18, which performs the computer program, will be described with reference to a flowchart in FIG. 3. The flowchart in FIG. 3 corresponds to a process of one cycle, and it is supposed that the process is repeatedly executed, so long as the key switch 20 is turned ON.

The process described below is started, when the hybrid vehicle 1 is stopped with the accelerator not being turned ON (i.e., with the accelerator not being operated, i.e., not being depressed), in a state in which the key switch 20 is turned ON, the hybrid ECU 18 executes the computer program, and the hybrid ECU 18 realizes the start control unit 30.

In step S1, the start control unit 30 determines whether the SOC and the temperature of the battery 15 are satisfactory or not. When it is determined that the SOC and the temperature of the battery 15 are not satisfactory in step S1, the process proceeds to step S2. On the other hand, when it is determined in step S1 that the SOC and the temperature of the battery 15 are satisfactory, the process proceeds to step S7.

The condition that the SOC and the temperature of the battery 15 are satisfactory means the condition in which the SOC is higher than SOC (hereinafter referred to as SOC threshold value) that can feed electric power, by which torque necessary for starting the vehicle can be generated, to the electric motor 13, and the temperature is lower than a certain temperature (hereinafter referred to as a temperature threshold value). On the other hand, the condition in which the SOC of the battery 15 is higher than the SOC threshold value, but the temperature is higher than the temperature threshold value, the condition in which the SOC of the battery 15 is lower than the SOC threshold value and the temperature is higher than the temperature threshold value, and the condition in which the SOC of the battery 15 is lower than the SOC threshold value and the temperature is lower than the temperature threshold value, are all unsatisfactory conditions. The reason why the temperature of the battery 15 is also determined is because, when the temperature of the battery 15 is high, electric power cannot be inputted and outputted due to the performance of the battery 15, so that electric power corresponding to the SOC cannot be fed to the electric motor 13, even if the SOC is satisfactory.

In step S2, the start control unit 30 determines whether the accelerator operation is applied or not. When it is determined that the accelerator operation is applied (accelerator ON: the operation of depressing the accelerator pedal is executed), the process proceeds to step S3. On the other hand, it is determined in step S2 that the accelerator operation is not applied, the process returns to step S1.

In step S3, the start control unit 30 starts a process of engaging the clutch 12.

Then, in step S4, the start control unit 30 determines whether the SOC and the temperature of the battery 15 are satisfactory or not. When it is determined in step S4 that the SOC and the temperature of the battery 15 are not satisfactory, the process proceeds to step S5. On the other hand, when it is determined in step S4 that the SOC and the temperature of the battery 15 are satisfactory, the process proceeds to step S6.

The criteria for determining the SOC and the temperature of the battery 15 in step S4 are the criteria for determining whether assist driving is possible or not, and it may be looser (lower) than the criteria for determining whether driving of the electric motor 13 only is possible or not in step S1. As for the SOC, the criterion in step S4 is set to be lower than the criterion in step S1. As for the temperature, the criterion in step S4 is set to be higher than the criterion in step S1.

In step S5, the start control unit 30 starts to execute the starting mode using the engine 10. Thus, the rotational speed of the engine 10 is increased to the rotational speed by which torque necessary for starting the vehicle can be output, and power from the engine 10 is transmitted to the wheel 19 through the clutch 12. In this case, the electric motor 13 may control to execute regeneration in order to increase the SOC of the battery 15, or the electric motor 13 may be free in order not to apply friction loss to the engine 10.

In step S6, the start control unit 30 starts the assist starting mode in which the vehicle is started by using the engine 10 in cooperation with the electric motor 13. With this process, the rotational speed of the electric motor 13 is increased to the rotational speed of the engine 10 (the rotational speed in the idling state), and power of the engine 10 and the electric motor 13 is transmitted to the wheel 19.

In step S7, the start control unit 30 determines whether the accelerator operation is applied or not. When it is determined that the accelerator operation is applied (accelerator ON), the process proceeds to step S8. On the other hand, when it is determined in step S7 that the accelerator operation is not applied, the process returns to step S1.

In step S8, the start control unit 30 disengages the clutch 12, and then, the process proceeds to step S9.

In step S9, the start control unit 30 starts the starting mode by using the electric motor 13.

When the process in step S5, step S6, or step S9 is executed, the process for one cycle of the starting mode is finished, and the above-mentioned process is repeatedly executed for a predetermined period, for example.

Subsequently, a changeover determination reference point for a start control method in the start control by the start control unit 30 will be described with reference to FIG. 4. When acquiring the SOC information or the temperature information of the battery 15, the start control unit 30 stores the acquired information into the observation data storage unit 31. The start control unit 30 confirms whether the SOC of the battery 15 changes from low SOC to high SOC, or vice versa, and also confirms whether the temperature of the battery 15 changes from high temperature to low temperature, or vice versa, by referring to the observation data storage unit 31. Thus, the reference point for the determination by the start control unit 30 in step S1 and step S4 in the flowchart illustrated in FIG. 3 is set to be a different point according to the direction of the change in the SOC or the temperature as illustrated in FIG. 4. In FIG. 4, only one of the SOC change or the temperature change may be focused.

Effect

The hybrid vehicle 1 determines whether or not it can start only by using the electric motor 13 according to the predetermined condition of the battery 15. When it is determined that the vehicle 1 cannot start only by using the electric motor 13, the vehicle 1 selects either one of the starting mode using only the engine 10 and the starting mode using the electric motor 13 and the engine 10 in cooperation with each other, according to the predetermined condition of the battery 15. Therefore, the vehicle 1 can start with excellent fuel economy without a lack of electric power and a lack of power.

Specifically, even if the vehicle 1 cannot start only by using the electric motor 13, the vehicle 1 can select not only the starting mode using only the engine 10, but also the assist starting mode that has excellent fuel economy compared to the starting mode using only the engine 10. Accordingly, starting with excellent fuel economy can be realized.

The temperature of the battery 15 is observed. Therefore, when sufficient electric power cannot be outputted even with the sufficient SOC, the starting mode using the engine is selected, whereby the vehicle 1 can appropriately start without a lack of power.

The SOC of the battery 15 temporarily reduces a little just after the battery 15 feeds electric power to the electric motor 13. Similarly, the temperature of the battery 15 temporarily increases a little just after the battery 15 feeds electric power to the electric motor 13. Since the SOC or the temperature of the battery 15 varies in a short period as described above, the situation in which the starting mode is again returned from the assist starting mode to the engine starting mode just after the starting mode is changed from the engine starting mode to the assist starting mode might be repeated (this is referred to as a mode hunting). According to this operation, unnecessary control is generated; for example, the control in which the clutch 12 is changed from the disengaged state to the engaged state is repeated in a short period, and the control in which the rotational speed of the engine 10 and the rotational speed of the electric motor 13 are synchronized is repeated in a short period. In order to avoid this situation, the assist starting mode may be controlled to be continued just after the starting mode is changed from the engine starting mode to the assist starting mode, even if the SOC or the temperature of the battery 15 slightly changes toward the engine starting mode.

In view of this, the change in the SOC or the temperature of the battery 15 is observed, and the reference point for the determination when the observation result is on the point of the process where the situation is changed from the situation in which the starting mode using the electric motor 13 is allowed to the situation in which the same starting mode is not allowed, and the reference point for the determination when the observation result is on the point of the process where the situation is changed from the situation in which the starting mode using the electric motor 13 is not allowed to the situation in which the same starting mode is allowed, are set to be different from each other. Thus, the start control unit 30 can execute a precise control without causing the mode hunting in the control by the start control unit 30 even under the situation in which the SOC or the temperature of the battery 15 varies in a short period.

Second Embodiment

Figure 5:
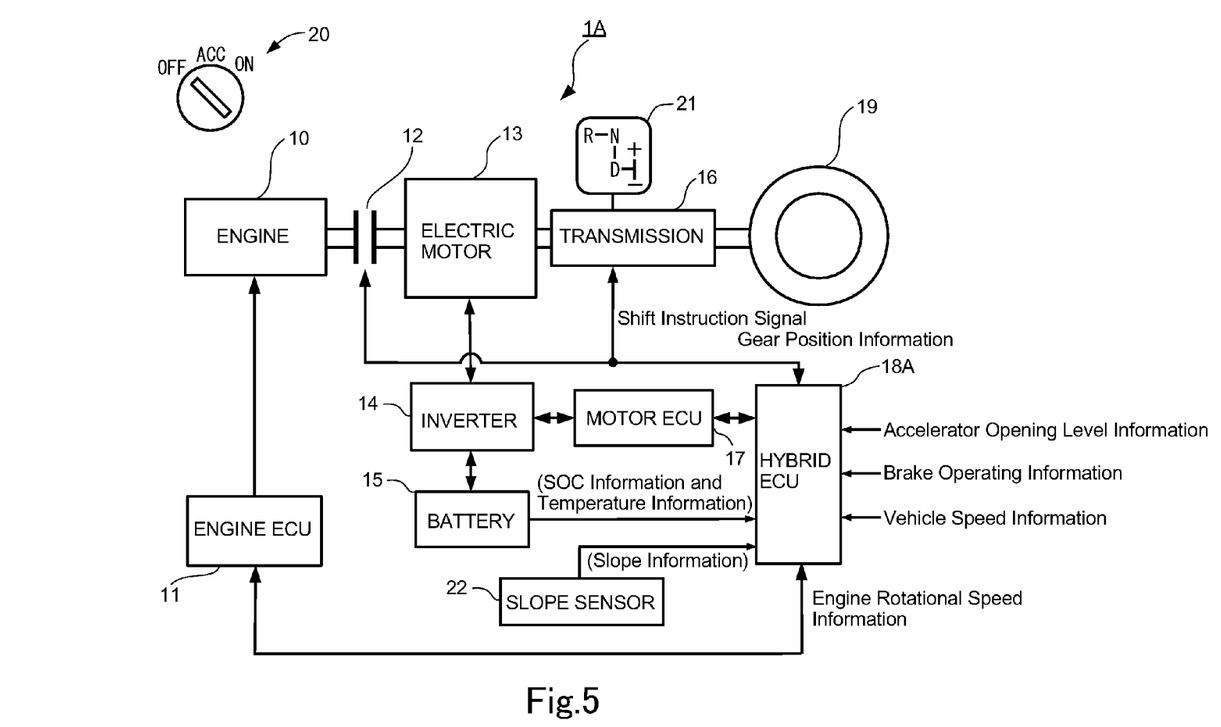
FIG. 5 is a block diagram illustrating an example of a configuration of a hybrid vehicle according to a second embodiment of the present invention.

A hybrid vehicle 1A according to a second embodiment of the present invention will be described with reference to FIGS. 5 to 7. As illustrated in FIG. 5, the hybrid vehicle 1A includes a slope sensor 22 in addition to the configuration of the hybrid vehicle 1 illustrated in FIG. 1.

Figure 6:
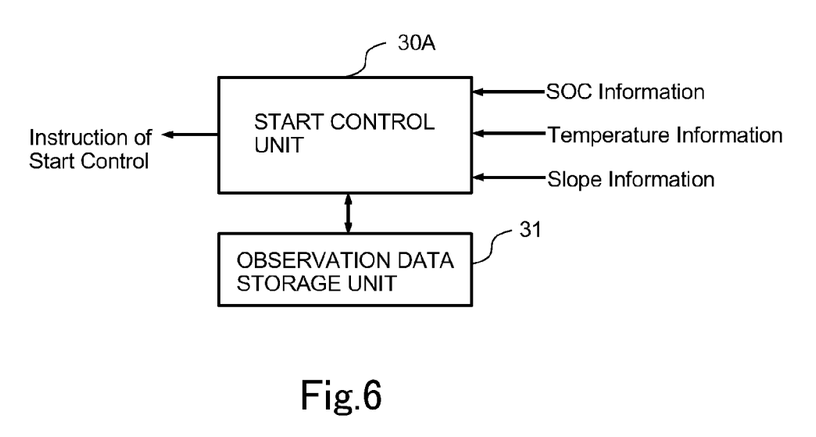
FIG. 6 is a block diagram illustrating an example of a configuration of functions realized by a hybrid ECU in FIG. 5.

FIG. 6 is a block diagram illustrating an example of a configuration of functions realized by a hybrid ECU 18A that executes a computer program. When the hybrid ECU 18A executes the computer program, a start control unit 30A and an observation data storage unit 31 are realized.

The start control unit 30A acquires not only the SOC information and temperature information of the battery 15, which are acquired by the start control unit 30 in the first embodiment, but also slope information from the slope sensor 22.

A process of a start control executed by the hybrid ECU 18A, which performs the computer program, will be described with reference to a flowchart in FIG. 7. The flowchart in FIG. 7 corresponds to a process of one cycle, and it is supposed that the process is repeatedly executed, so long as the key switch 20 is turned ON. In "START", the hybrid vehicle 1A is stationary.

Figure 3:
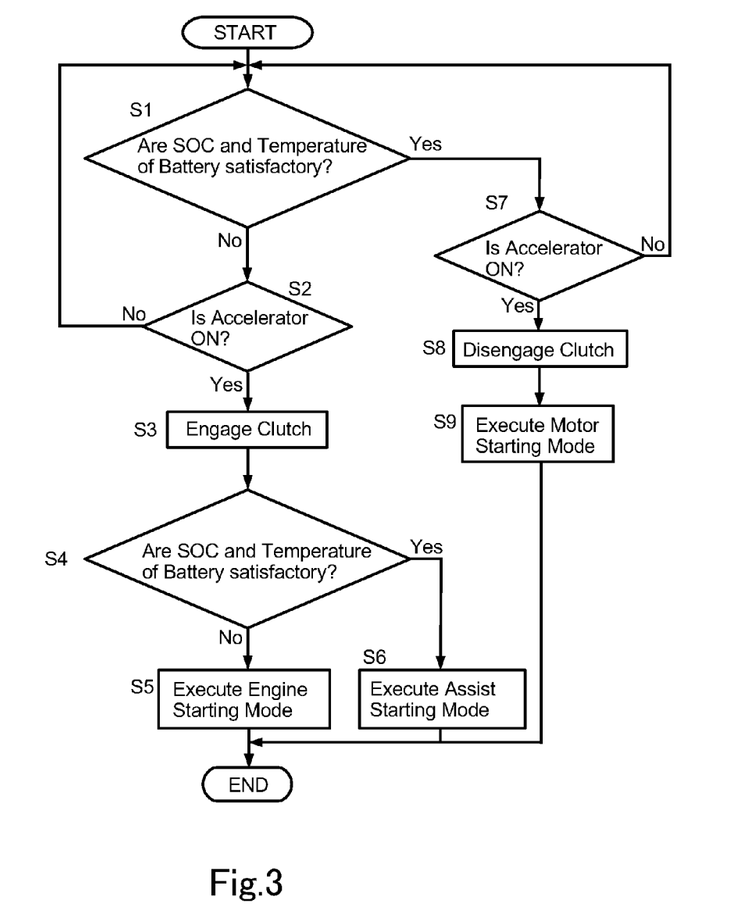
FIG. 3 is a flowchart illustrating a start control process in a start control unit in FIG. 2.
Figure 4:
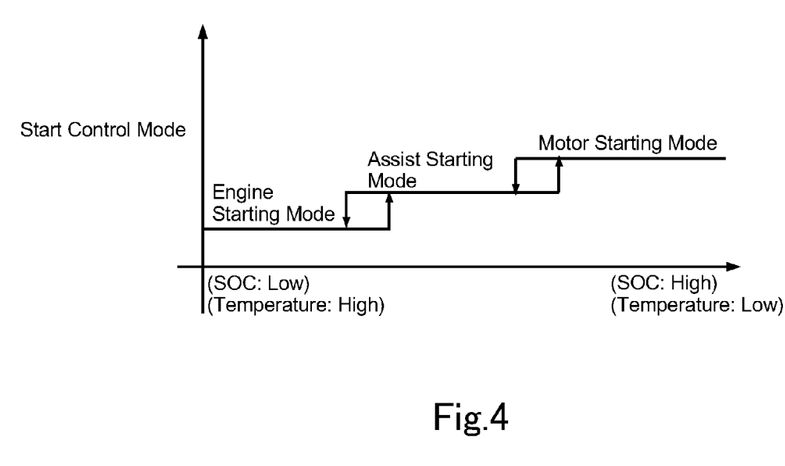
FIG. 4 is a view illustrating a changeover determination reference point for a start control method in the start control by the start control unit in FIG. 2.
Figure 7:
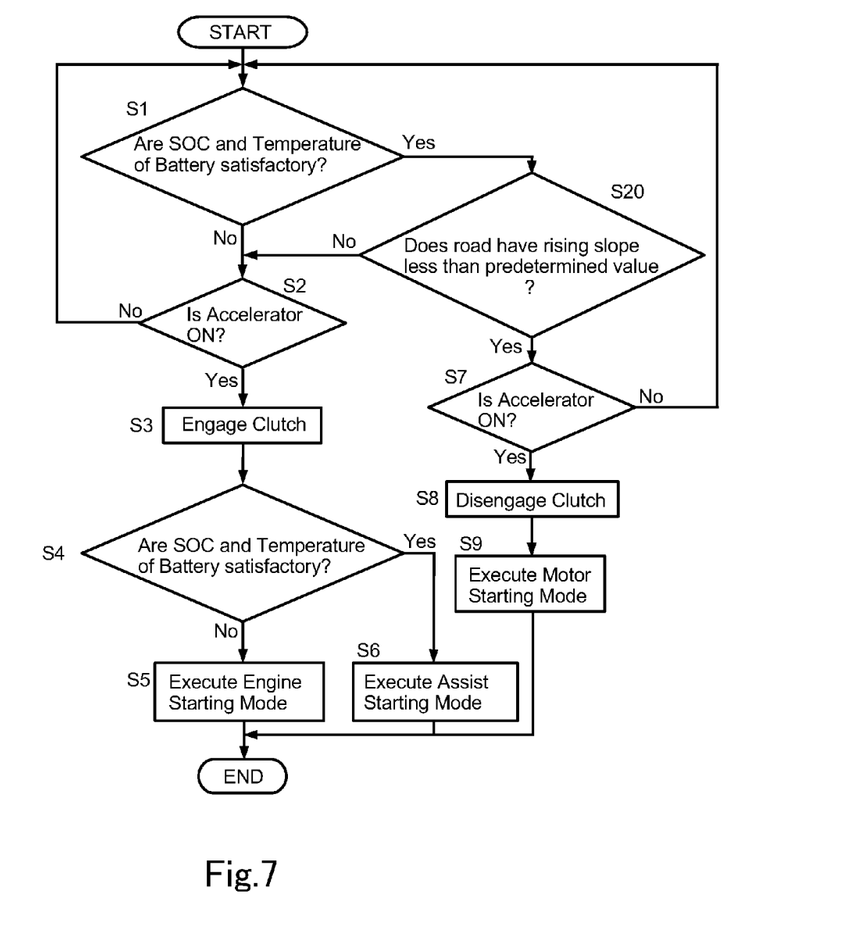
FIG. 7 is a flowchart illustrating a start control process in a start control unit according to the second embodiment of the present invention.

In the processes in the flowchart in FIG. 7, the processes in steps S1 to S9 are the same as those in the flowchart in FIG. 3, so that the description will not be repeated. The process in step S20 will mainly be described.

In step S1, the start control unit 30A determines whether the SOC and the temperature of the battery 15 are satisfactory or not. When it is determined that the SOC and the temperature of the battery 15 are not satisfactory in step S1, the process proceeds to step S2. On the other hand, when it is determined in step S1 that the SOC and the temperature of the battery 15 are satisfactory, the process proceeds to step S20.

In step S20, the start control unit 30A determines whether or not a road on which the hybrid vehicle 1A currently stops has a rising slope less than a predetermined value based upon the slope information acquired from the slope sensor 22. The predetermined value here represents a slope index of the rising slope, and it is represented as "X %", for example. The value of X is appropriately set according to a climbing ability of the electric motor 13 in the hybrid vehicle 1A. When it is determined in step S20 that the road on which the hybrid vehicle 1A currently stops has the rising slope less than the predetermined value based upon the slope information acquired from the slope sensor 22, the process proceeds to step S7. On the other hand, when it is determined in step S20 that the road on which the hybrid vehicle 1A currently stops has the rising slope equal to or more than the predetermined value based upon the slope information acquired from the slope sensor 22, the process proceeds to step S2.

Effect

The hybrid vehicle 1A not only determines whether it can start only by using the electric motor or not depending upon the SOC or temperature of the battery 15, but also determines whether the vehicle can start only by using the electric motor depending upon the slope of the road on which the hybrid vehicle 1A is stopping. Therefore, the hybrid vehicle 1A can start with excellent fuel economy without a lack of electric power and a lack of power according to the road environment. Specifically, when the hybrid vehicle 1A is stopping on an uphill, torque is required for the start. Therefore, upon the start of the hybrid vehicle 1A stopping on the uphill, the hybrid vehicle 1A selects the assist starting mode or the engine starting mode, even if the starting mode using only the electric motor 13 is allowed according to the SOC condition or the temperature condition of the battery 15. Thus, the hybrid vehicle 1A can start with excellent fuel economy without a lack of electric power and a lack of power.

Other Embodiments

In the description of the flowchart described above, the boundary for the determination region may be modified. For example, "equal to or more than" can be changed to "more than", and "less than" can be changed to "not less than."

Upon the determination of the state of the battery 15, only the SOC of the battery 15, or only the temperature of the battery 15 may be used.

It is described that the engine 10 is the internal combustion engine. However, the engine 10 may be a thermal engine including an external combustion engine.

The computer program executed by the hybrid ECUs 18 and 18A is installed beforehand in the hybrid ECUs 18 and 18A in the above description. However, a removable media on which the computer program is stored (that stores the computer program) may be attached to a drive not illustrated, and the computer program read from the removable media may be stored on the non-volatile memory in the hybrid ECUs 18 and 18A, or the computer program sent via a wired or wireless transfer medium may be received by a communication unit not illustrated, and stored in the non-volatile memory in the hybrid ECUs 18 and 18A, whereby the computer program may be installed to the hybrid ECUs 18 and 18A that are a computer.

The respective ECUs may be realized by an ECU having some of these functions or all of these functions. Alternatively, an ECU having classified functions of each ECU may newly be provided.

The computer program executed by the computer may be a computer program by which the process is executed in a time-series manner according to the order described in the present specification, or may be a computer program by which the process is executed simultaneously, or on a necessary timing when called.

The embodiment of the present invention is not limited to the above-mentioned embodiment, and various modifications are possible without departing from the scope of the present invention.

In the embodiments described above, the determination is made based upon the SOC and the temperature of the battery 15 in steps S1 and S4 in the flowchart in FIG. 3 or in FIG. 7. However, the determination may be made based upon any one or more of other factors including the temperature of the inverter 14 and the temperature of cooling water of the inverter 14.

In the embodiments described above, it is not supposed that the hybrid vehicle 1 is on a road having a descending slope upon the start. When the hybrid vehicle 1 is on the road with a descending slope, and the cause of No in the determination result in step S1 mainly lies in the SOC of the battery 15, the process may proceed to step S7. This is because the starting mode using only the electric motor 13 (step S9) may be carried out with the clutch 12 being disengaged (step S8), since the regenerative power generation is possible just after the hybrid vehicle 1 starts, even if the SOC of the battery 15 is lower than a prescribed value. However, when the cause of No in the determination result in step S1 mainly lies in the temperature of the battery 15, the regenerative power generation cannot be executed, so that the process has to proceed to step S2. On a descending slope that is almost flat, the regenerative power generation just after the start is not expected as described above. Therefore, it may be controlled such that a threshold value is set for an angle of the descending slope, and in case where the determination result in step S1 is No, and its cause mainly lies in the SOC, not in the temperature of the battery 15, only when the angle of the descending slope is not less than the threshold value, the process proceeds to step S7.

The invention claimed is:

1. A start control method in a start control device controlling a start of a hybrid vehicle that includes an engine, an electric motor, a hybrid Electronic Control Unit (ECU), and a battery supplying electric power to the electric motor, and that can run by using the engine, by using the electric motor, or by using the engine and the electric motor in cooperation with each other, the start control method comprising:
    a selecting step of selecting, by the ECU, in accordance with a state of charge and temperature of the battery, any one of a starting mode using only the electric motor when the state of charge is satisfactory and the temperature is lower than a temperature threshold value, a starting mode using the electric motor and the engine in cooperation with each other when the state of charge and the temperature are in a condition where such a starting mode is possible, and a starting mode using only the engine when the state of charge and the temperature are in a condition where the starting mode using the electric motor and the engine in cooperation with each other is not possible, according to a predetermined condition of the battery; and
    a control step of controlling, by the hybrid ECU, the execution of the start according to the selected starting mode.

2. The start control method according to claim 1, wherein the predetermined condition is a condition involved with a charged state of the battery, a condition involved with a temperature of the battery, and a condition involved with both the charged state of the battery and the temperature of the battery.

3. The start control method according to claim 1, further comprising:
    a step of observing a change in the charged state or the temperature of the battery, wherein
    a reference point for the determination when the observation result is on the point of the process where the situation is changed from the situation in which the starting mode using only the electric motor is allowed to the situation in which the same starting mode is not allowed, and a reference point for the determination when the observation result is on the point of the process where the situation is changed from the situation in which the starting mode using only the electric motor is not allowed to the situation in which the same starting mode is allowed, are set to be different from each other.

4. The start control method according to claim 1, wherein a state of a rising slope of a road surface where the hybrid vehicle starts is added as the condition in addition to the predetermined condition, and the starting mode using only the electric motor is not allowed, when a value indicating the rising slope exceeds a predetermined value even if the starting mode using only the electric motor is allowed by the determination result in the process of the first step.

5. A start control device that controls a start of a hybrid vehicle that includes an engine, an electric motor, a hybrid Electronic Control Unit (ECU), and a battery supplying electric power to the electric motor, and that can run by using the engine, by using the electric motor, or by using the engine and the electric motor in cooperation with each other, the start control device comprising:
  a start control unit that executes the following steps:
    a selecting step of selecting, by the hybrid ECU, in accordance with a state of charge and temperature of the battery, any one of a starting mode using only the electric motor when the state of charge is satisfactory and the temperature is lower than a temperature threshold value, a starting mode using the electric motor and the engine in cooperation with each other when the state of charge and the temperature are in a condition where such a starting mode is possible, and a starting mode using only the engine when the state of charge and the temperature are in a condition where the starting mode using the electric motor and the engine in cooperation with each other is not possible, according to a predetermined condition of the battery; and
    a control step of controlling, by the hybrid ECU, the execution of the start according to the selected starting mode.

6. A hybrid vehicle comprising:
  a start control device that controls a start of a hybrid vehicle that includes an engine, an electric motor, a hybrid Electronic Control Unit (ECU), and a battery supplying electric power to the electric motor, and that can run by using the engine, by using the electric motor, or by using the engine and the electric motor in cooperation with each other, the start control device comprising a start control unit,
  wherein the start control unit executes the following steps:
    a selecting step of selecting, by the hybrid ECU, in accordance with a state of charge and temperature of the battery, any one of a starting mode using only the electric motor when the state of charge is satisfactory and the temperature is lower than a temperature threshold value, a starting mode using the electric motor and the engine in cooperation with each other when the state of charge and the temperature are in a condition where such a starting mode is possible, and a starting mode using only the engine when the state of charge and the temperature are in a condition where the starting mode using the electric motor and the engine in cooperation with each other is not possible, according to a predetermined condition of the battery; and
    a control step of controlling, by the hybrid ECU, the execution of the start according to the selected starting mode.

7. A non-transitory computer readable storage medium that causes an information processing apparatus to implement a function of a start control device that controls a start of a hybrid vehicle that includes an engine, an electric motor, a hybrid Electronic Control Unit (ECU), and a battery supplying electric power to the electric motor, and that can run by using the engine, by using the electric motor, or by using the engine and the electric motor in cooperation with each other, the start control device comprising:
  a start control unit that executes the following steps:
    a selecting step of selecting, by the hybrid ECU, in accordance with a state of charge and temperature of the battery, any one of a starting mode using only the electric motor when the state of charge is satisfactory and the temperature is lower than a temperature threshold value, a starting mode using the electric motor and the engine in cooperation with each other when the state of charge and the temperature are in a condition where such a starting mode is possible, and a starting mode using only the engine when the state of charge and the temperature are in a condition where the starting mode using the electric motor and the engine in cooperation with each other is not possible, according to a predetermined condition of the battery; and
    a control step of controlling, by the hybrid ECU, the execution of the start according to the selected starting mode.

* * * * *